United States Patent
Mohindra et al.

(10) Patent No.: US 7,496,893 B2
(45) Date of Patent: Feb. 24, 2009

(54) METHOD FOR NO-DEMAND COMPOSITION AND TEARDOWN OF SERVICE INFRASTRUCTURE

(75) Inventors: Ajay Mohindra, Yorktown Heights, NY (US); Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 11/453,741

(22) Filed: Jun. 15, 2006

(65) Prior Publication Data
US 2007/0294668 A1   Dec. 20, 2007

(51) Int. Cl.
G06F 9/44  (2006.01)
G06F 15/173  (2006.01)

(52) U.S. Cl. ..................... 717/120; 709/224
(58) Field of Classification Search .................. None
See application file for complete search history.

(56) References Cited

U.S. PATENT DOCUMENTS

| | | | |
|---|---|---|---|
| 6,286,047 B1 * | 9/2001 | Ramanathan et al. | 709/224 |
| 6,330,689 B1 | 12/2001 | Jin et al. | |
| 6,901,442 B1 | 5/2005 | Schwaller et al. | |
| 7,013,461 B2 * | 3/2006 | Hellerstein et al. | 717/177 |
| 7,243,306 B1 * | 7/2007 | Joshi et al. | 715/735 |
| 2003/0167270 A1 | 9/2003 | Werme et al. | |
| 2004/0003390 A1 * | 1/2004 | Canter et al. | 717/178 |
| 2004/0103195 A1 | 5/2004 | Chalasani et al. | |
| 2004/0261060 A1 * | 12/2004 | Haselden et al. | 717/120 |
| 2007/0050431 A1 * | 3/2007 | Vaidya et al. | 707/204 |

OTHER PUBLICATIONS

Goldsack et al, "SmartFrog: Configuration and Automatic Ignition of Distributed Applications", May 29, 2003, HP OVUA 2003, pp. 1-9.
Anderson, "Towards a High-Level Machine Configuration System", Sep. 19-23, 1994 LISA Conference, San Diego, CA, pp. 19-26.
YOR920060279US1, filed Jun. 15, 2006, Mohindra et al.
YOR920060184US1, filed Jun. 15, 2006, Mohindra et al.
YOR920060185US1, filed Jun. 15, 2006, Mohindra et al.

* cited by examiner

*Primary Examiner*—Tuan Q Dam
*Assistant Examiner*—Isaac T Tecklu
(74) *Attorney, Agent, or Firm*—Duke W. Yee; Kevin Jordan; A. M. Thompson

(57) ABSTRACT

A computer implemented method for creating a composite service. Dependencies are identified utilizing a set of active objects used to manage services to form identified dependencies in response to receiving a request for the composite service. The identified dependencies specify requirements of the composite service. The composite service has multiple components. Components are identified for the composite service using the identified dependencies to form identified components. The composite service is created using the identified components.

1 Claim, 9 Drawing Sheets

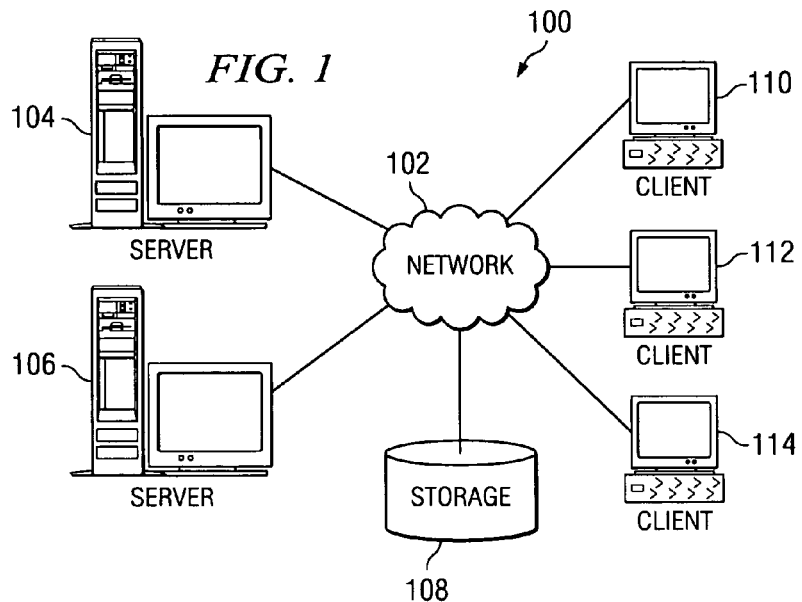

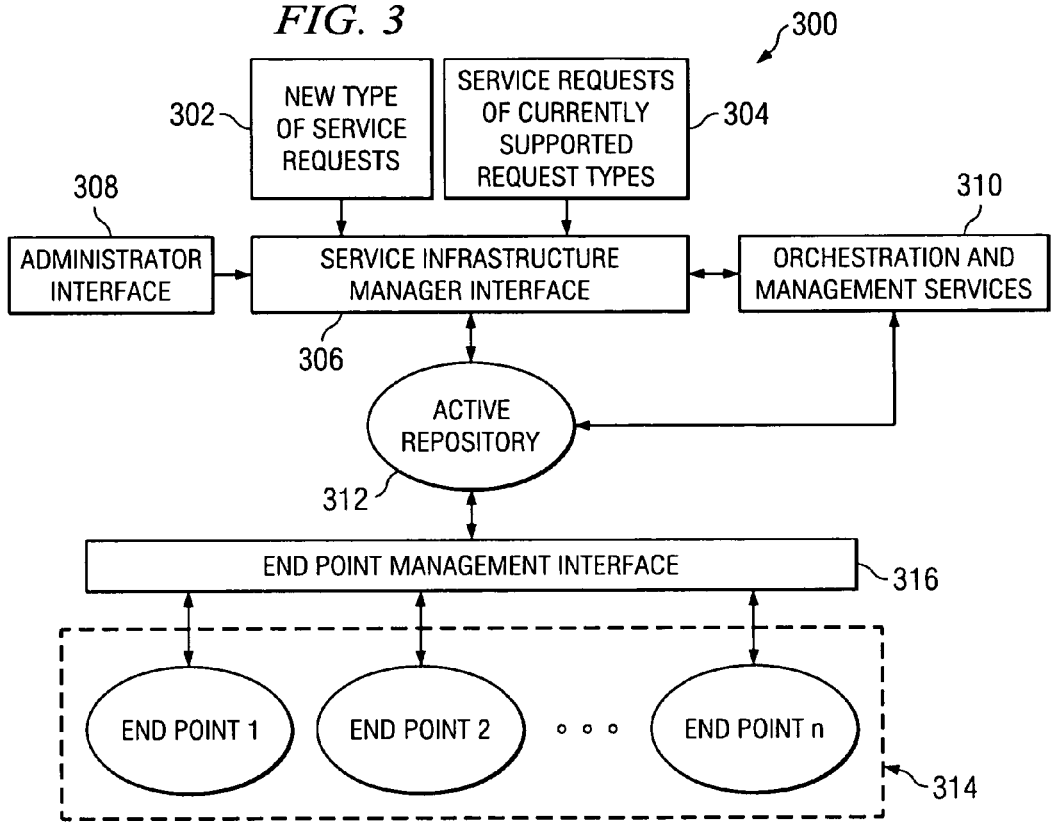
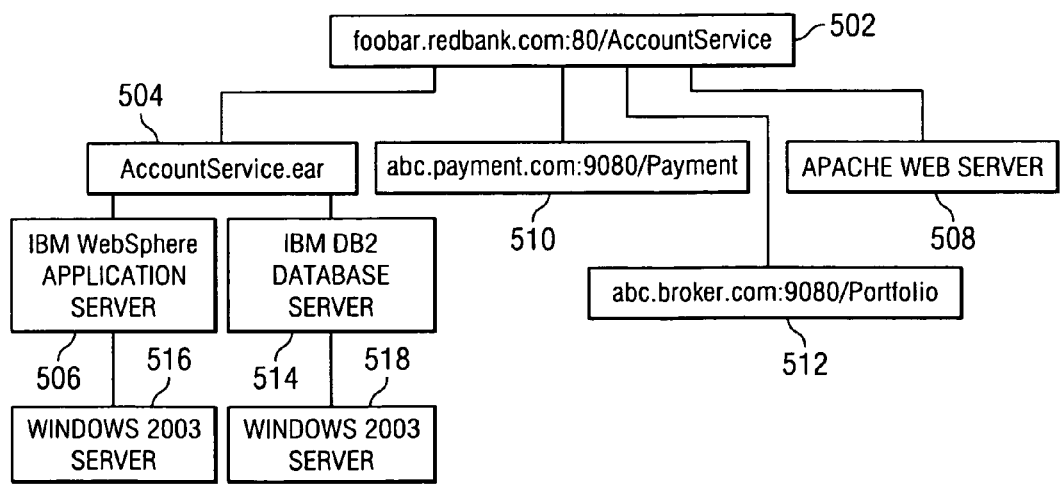

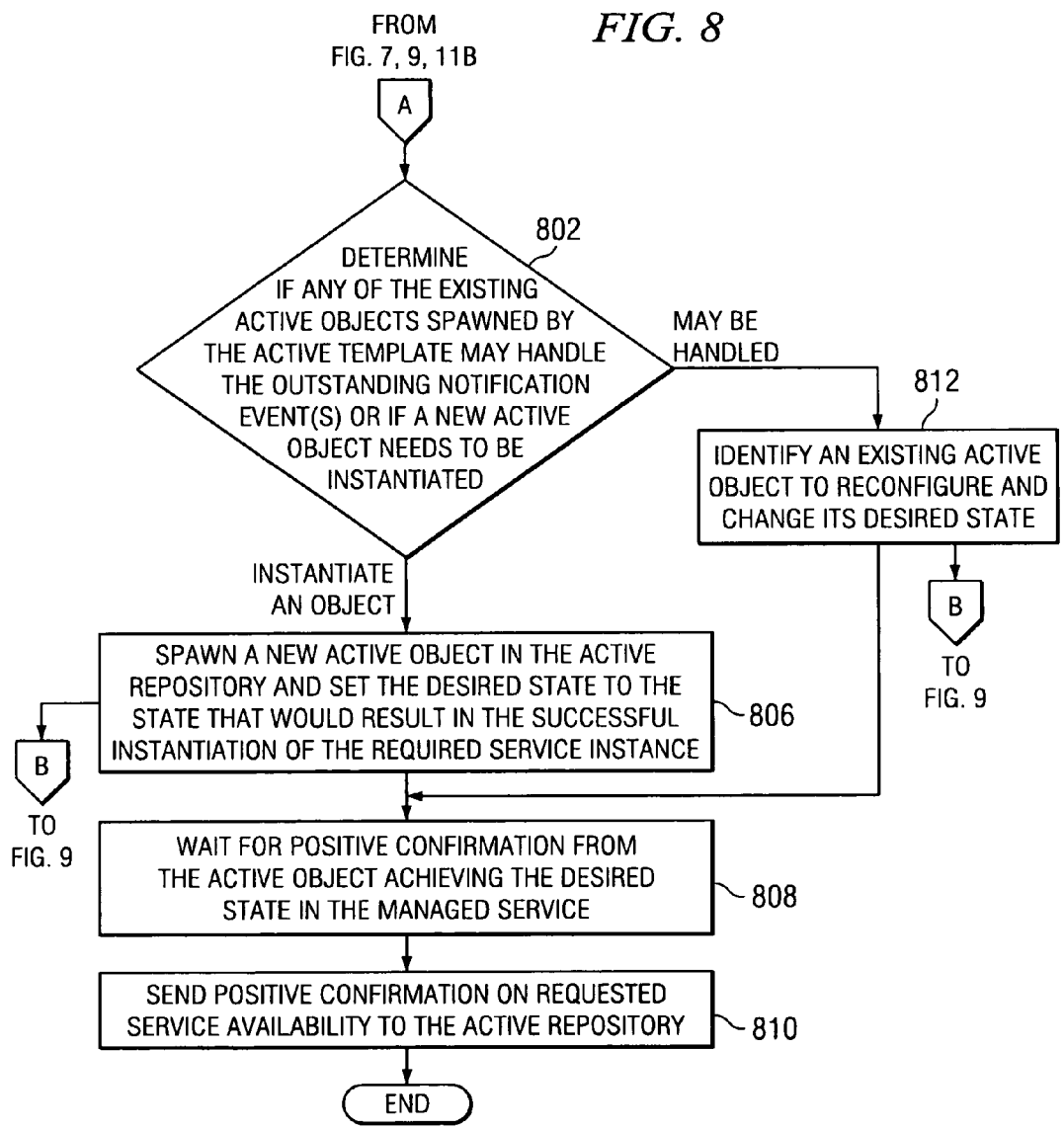

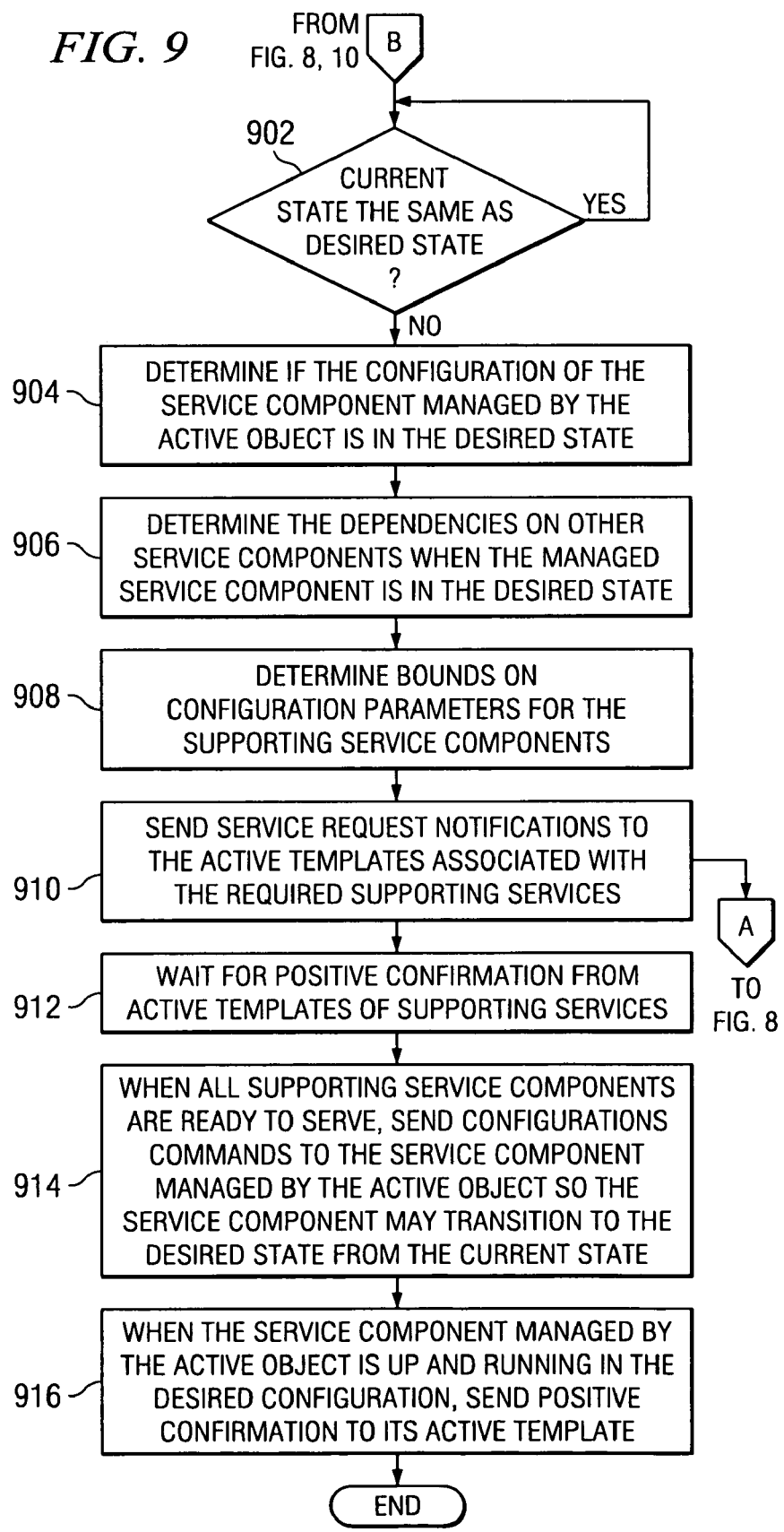

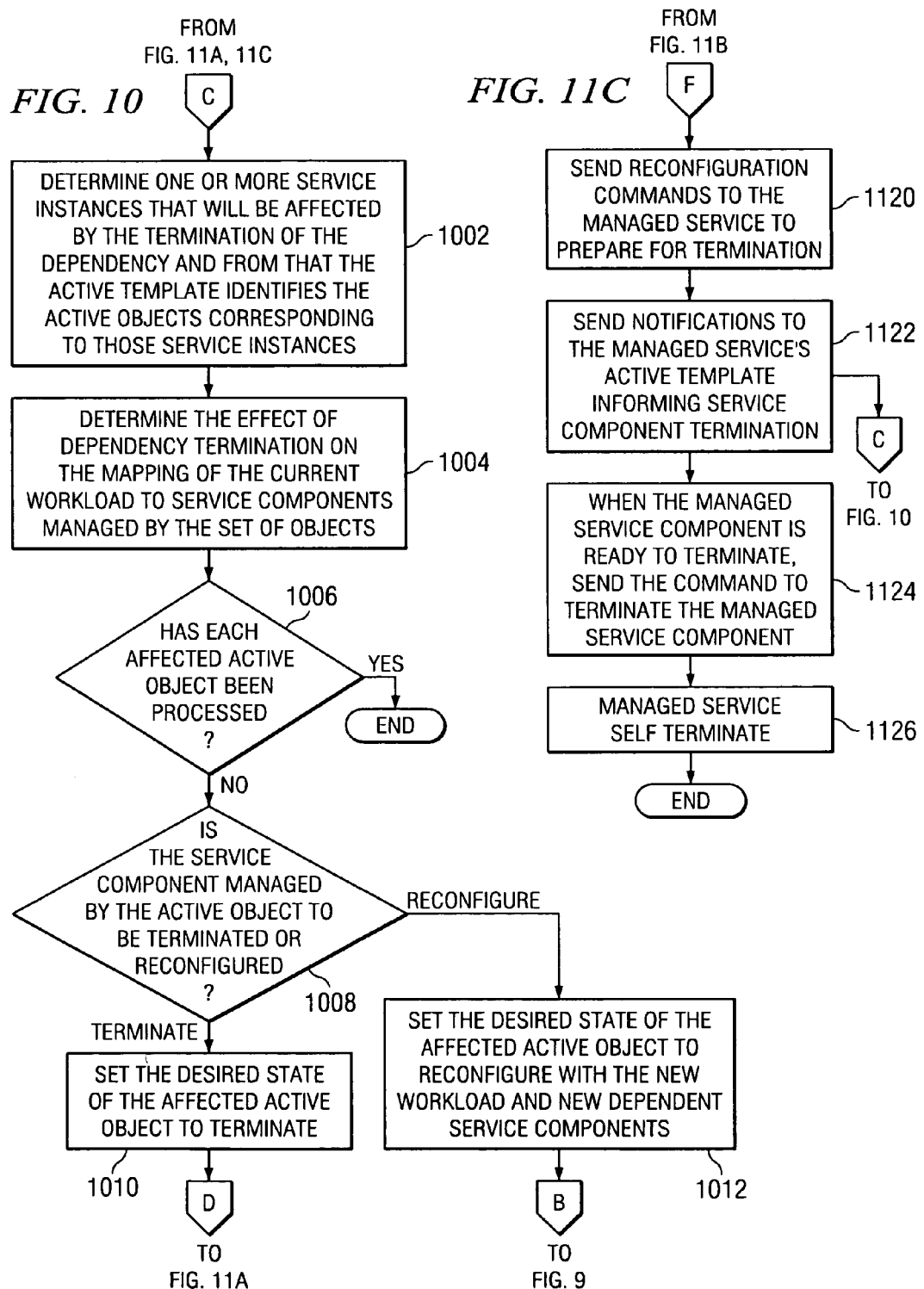

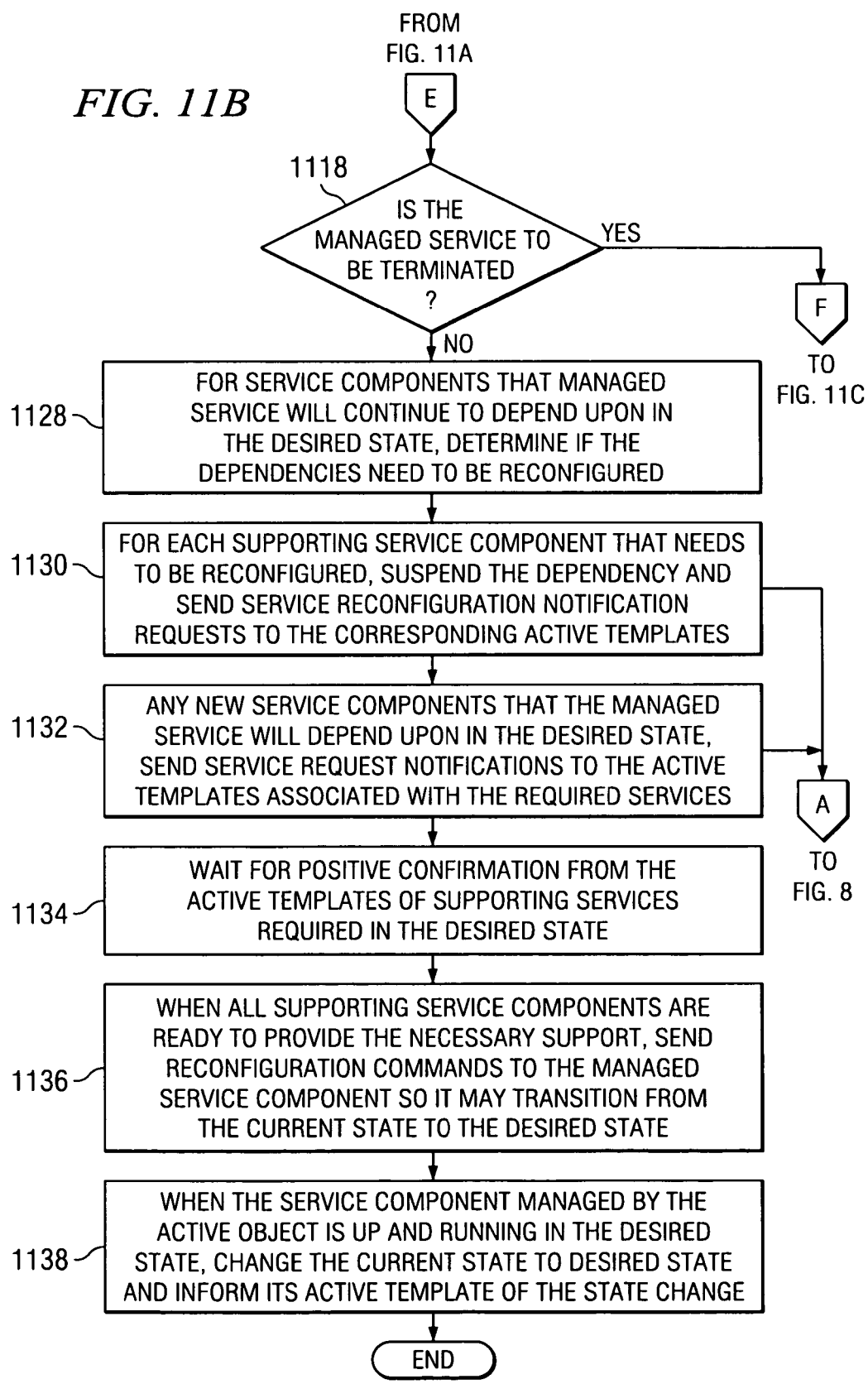

METHOD FOR NO-DEMAND COMPOSITION AND TEARDOWN OF SERVICE INFRASTRUCTURE

BACKGROUND OF THE INVENTION

1. Field of the Invention

The present invention relates generally to networked computer systems. More particularly, the present invention relates to software and systems management in networked computer environments.

2. Description of the Related Art

Distributed environments such as clusters of computing systems, data centers, and grid systems involve managing a large number of resources and service components. Typical end-service provided to the users of such systems requires composition of multiple resources and service components which together deliver the end-service that is of interest to the users. Such composition of multiple components or composite services require careful configuration of the components and deployment of these components such that they interface with each other in a compatible manner so that the composite service is deployed, initialized, handles the workload submitted by users, handles component level faults gracefully, and provides robust service while handling fluctuations in the workload.

Realizing such composition from components involves orchestration of a large number of heterogeneous resources and service components. Managing the various tasks manually tends to be tedious and error prone. The magnitude of the complexity increases when resources belong to multiple administrative domains. While grid-based systems can facilitate resource sharing across multiple administrative domains, the grid-based systems are much harder to manage from a system administrator point of view. One reason for the harder management is that the current state of the art in system management technology has not kept pace with the advances in middleware and grid technologies. Some progress has been made in managing single or cluster-based systems. Even for such systems, system administrators face a much higher level of complexity when they configure and deploy a new service on an existing infrastructure or manage the lifecycle of the existing service and software stack. The situation is much worse in a complex application environment; for example, an environment involving orchestration of a workflow formed by multiple business processes. In such a case, deployment and life cycle management solutions need to take an integrated view of the multiple tiers involved, and current system management technologies do not provide the necessary means to build such solutions.

Traditional methods for configuration and deployment of software components rely heavily upon domain experts' knowledge about the component requirements, availability of middleware and the underlying infrastructure, and overall IT environment. Using this background knowledge, a system administrator is first required to configure the existing infrastructure and then customize the configuration and deployment steps for a new component so the new component can be deployed successfully. In case of distributed components, such an approach can be time consuming, error prone, and non-scalable to large scale installations. Further, such an approach does not lend itself to automation, as system administrators are key components in the deployment workflow.

The ability to configure and manage large installations of systems has been an active area of research within the information technology community. The Local Configuration (LCFG) is a currently used script based system that dynamically configures machines based upon configuration information stored in a central database (Anderson, P., "Towards a High-Level Machine Configuration System," LISA, 1994). The information pertains to network, system, and services that need to be configured on the system. Smart Framework for Object Groups (SmartFrog) is a known system for specifying the configuration and deployment of distributed applications (Goldsack, P, Guijarro, J, Mecheneau, G, Murray, P, Toft, P, "SmartFrog: Configuration and Automatic Ignition of Distributed Applications," HP OVUA 2003). SmartFrog provides a language to specify the configuration of applications and dependencies between them. SmartFrog provides an infrastructure for processing and deploying applications on the distributed systems. The GridWeaver project is exploring the notion of combining LCFG and SmartFrog technologies for configuration management of large systems. The Organization for the Advancement of Structured Information Standards (OASIS) effort is looking at managing distributed resources using web services. The Grid Forum is attempting to standardize the specification language as part of the Configuration Description, Deployment, and Lifecycle Management (CDDLM) activity.

Some technologies provide means to monitor individual Java® 2 Platform Enterprise Edition (J2EE) components that are participating in providing a service. The technology helps system administrators to monitor performance, identify failures, and check performance bottlenecks.

SUMMARY OF THE INVENTION

Illustrative embodiments provide a computer implemented method, apparatus, and computer usable program code for creating a composite service. Dependencies are identified utilizing a set of active objects used to manage services to form identified dependencies in response to receiving a request for the composite service. The identified dependencies specify requirements of the composite service. The composite service has multiple components. Components are identified for the composite service using the identified dependencies to form identified components. The composite service is created using the identified components.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

FIG. 1 depicts a pictorial representation of a network of data processing systems in which the illustrative embodiments may be implemented;

FIG. 2 depicts a block diagram of a data processing system in which the illustrative embodiments may be implemented;

FIG. 3 depicts a composition based service management infrastructure using an active repository for configuration and deployment in accordance with an illustrative embodiment;

FIG. 5 is an example of an object dependency graph for a service in accordance with an illustrative embodiment;

FIG. 8 is a flowchart for service composition for an active template in accordance with an illustrative embodiment;

FIG. 9 is a flowchart for a service composition for an active object in accordance with an illustrative embodiment;

FIG. 10 is a flowchart for service decomposition process for an active template in accordance with an illustrative embodiment; and FIGS. 11A-11C are flowcharts for service decomposition for an active object in accordance with an illustrative embodiment.

DETAILED DESCRIPTION OF THE PREFERRED EMBODIMENT

Figure 4:
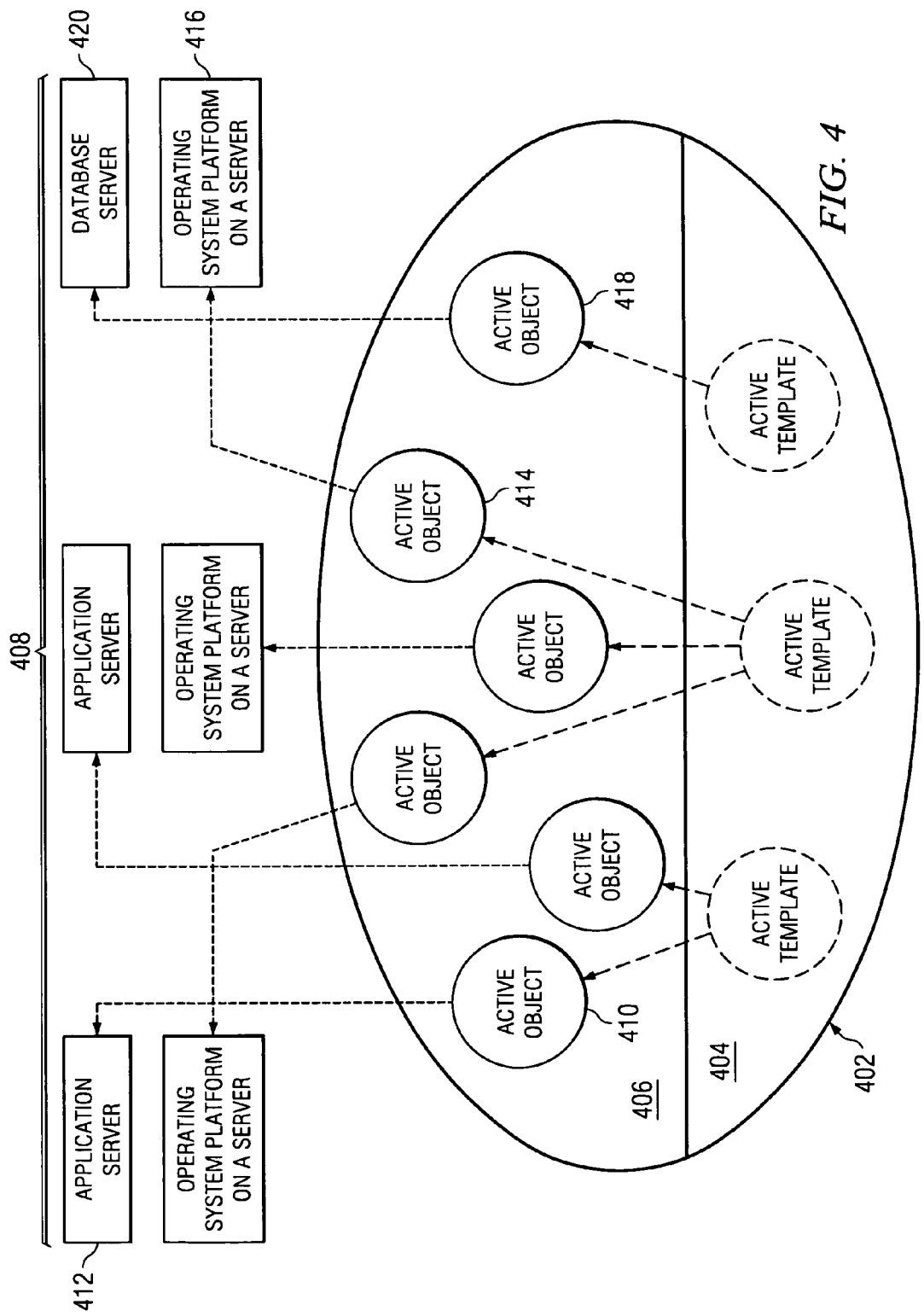
FIG. 4 depicts the components of an active repository in accordance with an illustrative embodiment.

The following document uses the term "physical resource" or "resource" to mean a hardware resource, such as a computer server, a computer network, a file system, etc. Such resources may be turned on or off, shared or used in dedicated mode, and have a physical location. The term "computer service" is used to indicate a service provided by a computer program that runs on top of one or more resources.

The illustrative embodiments provide a solution to the management of software components and services. With reference now to the figures, and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the illustrative embodiments.

With reference now to the figures, FIG. 1 depicts a pictorial representation of a network of data processing systems in which the illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which the illustrative embodiments may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide for a computer implemented method, apparatus, and computer usable program code for on-demand composition and teardown of service infrastructure. The method configures and deploys software service and resource components on distributed environments, such as cluster environments, data center type environments, and shared grid environments so that components work together to provision a composite service that behaves in an expected manner. An automatic management and control occurs at the component level as well as at the composite federated level.

A software service is a service provided by a computer program or a collection of programs that runs on a local and/or remote computer network, provides partial or complete solution to a service request, and does not require the requestor to perform any of the management tasks associated with the service including configuration, deployment, and life-cycle management tasks. Some examples of a software service are a payroll service, customer relation service, supply-chain management service, search engine service, e-mail service, authentication service, messaging service, a generic application management service such as the one provided by WebSphere® Application Server, database service, network connectivity service, and so on.

Software service management includes service dependency analysis, planning and scheduling resources and deployed services, configuration management, deployment management, and post-deployment lifecycle management. These management functions are themselves software services. The illustrative embodiments provide these management services so that the necessary installation, configuration, and deployment of software services are performed in a systematic and controlled manner in response to service requests from users. Further, the embodiments manage the deployed services so that the services perform at the level desired by currently requested workloads and/or anticipated future workloads and these services are taken offline or terminated when not required or require maintenance.

The illustrative embodiments provide management services to maintain the deployed services in a desired state and take corrective actions when the service state deviates from the desired state. In response to an alert pertaining to a particular service, the management services in the embodiments automatically trigger analysis to determine the cause of the alert, determine if an alternate resource or supporting service needs to be used, and redeploy the managed services using alternate resources and/or services. These management services are scalable, inherently autonomic, and may manage services for multiple platforms.

FIG. 3 depicts a composition based service management infrastructure using an active repository for configuration and deployment in accordance with an illustrative embodiment. In composition based service management infrastructure 300, new type of service requests 302 and service requests of currently supported request types 304 arrive at service infrastructure manager interface 306. A service request is a request for service either from (i) an end-user, (ii) another service in the system, or (iii) another service elsewhere in the network. The requested service is a service that the system is capable of providing using one or more software services and physical resources supported by the system.

Note that a request may be processed by multiple software services before completion and all such services need to be made available by configuring, deploying, and managing at runtime. A software service may be supported by the system, but the software service may not be configured and deployed at all times. Even if the software service is configured and deployed, the software service may not be configured to fulfill the requirements of a service request in terms of desired performance and/or the manner in which the service is to be delivered. For example, a request may ask for a service to be delivered in secure or in dedicated service delivery mode.

New types of service requests 302 consist of requests for software services, which are currently not configured and deployed in the system. Service requests of currently supported request types 304 are those requests that are requesting services that are already configured and deployed in the system. The requests of new or currently supported types are serviced by software services that run on end point resources 314. Processing of the requests at service infrastructure manager interface 306 takes place transparent to the service requesters.

Administrators may interact with the system for performing actions, such as setting policies for configuring or reconfiguring resource states, for configuring and deploying software services by overriding default settings, and similar operations using administrator interface 308. Commands issued by administrators are sent via administrator interface 308 to service infrastructure manager interface 306. At the backend, service infrastructure manager interface 306 interacts with orchestration and management services 310 and active repository 312. Active repository 312 consists of active objects and active templates. The active objects interact with end point resources 314 or with the software services that run on top of the end point resources via end point management interface 316. In addition, orchestration and management services 310 also interacts with active repository 312. As mentioned earlier, requests are actually processed at end point resources 314.

FIG. 4 depicts the components of an active repository in accordance with an illustrative embodiment. Active repository 402 may be an active repository, such as active repository 312 of FIG. 3. As described previously, active repository 402 consists of active templates 404 and active objects 406. An active template is a template for an active object. An active object is a management object that is used to manage an instantiated or to be instantiated service instance, such as one of managed service components 408, using available resources and other managed service instances. Each physical resource and service component in the system has a representative active object in active repository 402. The active object manages that resource or that service. Resources and services or supporting resources and supporting services are referred to as components for building a composite service. For each type of service being managed, there is an active template in active templates 404 in active repository 402.

Whenever a new instance of a service is instantiated, a new active object is also instantiated in active objects 406 from an active template in active templates 404 that represents the type of service being instantiated. However, not every active template in active templates 404 may have an instantiated active object in active objects 406 at all times.

New active objects are instantiated in active objects 406 based on the physical resources being managed and the current set of services composed using these physical resources. Resources are components that are required to implement services. For example, a resource may be a physical compute server, an application server, or a web server. A service is a function offered by a logical component. For example, a compute service may provide compute function while a database service may provide a storage function. Resources may be strictly hardware resources, software resources, or a combination of hardware and software.

As new services are composed and instantiated on top of existing services and/or physical resources, new active objects may be instantiated in active objects 406. Similarly, when a composite service is no longer needed, both the composite service and the active object used to manage that composite service are both terminated. The terminated active object is garbage collected. In addition, the active objects within active objects 406 corresponding to the component services or resources used to support and compose the service being terminated are all updated to reflect the fact that they are no longer supporting the composite service. When a component is no longer needed, the corresponding active object within active objects 406 is destroyed and garbage collected.

Active templates 404 are updated as their scope changes or as the environment controlled by the corresponding active object is fixed, updated, or otherwise evolves. New active templates are also introduced into active templates 404 when new types of resources or services are introduced in the managed environment. For example, when WebSphere® 6.0 is introduced in the system as an Enterprise JavaBeans™ (EJB) container service, a new template is introduced in active templates 404. This is done even if an active template for WebSphere® 5.x existed in active templates 404. This is because managing WebSphere® 6.0 is significantly different than managing WebSphere® 5.x containers. The active template has information on service being provided, dependency requirements, and configuration and deployment information for one or more platforms.

When WebSphere® 6.01 is to be supported, a new template is not introduced, but the existing template is updated to accommodate the differences. An update to the template for WebSphere® 6.0 container is applied because the differences in two released versions are small from the point of view of management. The active objects derived from the template may manage a WebSphere® 6.0 container as well as a Websphere® 6.01 container. Similarly, if initially WebSphere® 6.0 is to be deployed only on Linux® platforms, the template for WebSphere® 6.0 has the information for managing the container on Linux® platforms only. If later, WebSphere® 6.0 is to be deployed and supported on Windows® platforms as well, the template for WebSphere® 6.0 needs to be updated to add this capability which is an example of changing the scope of a template.

When a new service component is to be deployed and enabled, a new service instance object in the form of an active object is instantiated in active repository 402. The active object manages the actual service instance to be composed, configured, and deployed in the system. For successful deployment and functioning, a service instance may require support from other service and resource instances. The required support is referred to as dependencies of the service instance and dependency requirements for the corresponding active object in active repository 402.

Each active object in active objects 406 in active repository 402 is programmed to manage a particular resource or a service component to deliver component specific service by achieving a desired state. A desired state is the state required to achieve a desired effect or behavior from the actual service instance managed by the active object. Each active object in active objects 406 is aware of the current state and the desired state of the managed resource or service component for which it has the management responsibilities. The desired state may be influenced by system administrators, policy managers, or other objects in the system. If an active object has unfulfilled dependency requirements, the active object's current state will not transform to the desired state until the dependencies are met successfully. If the observed state of the service instance does not match with the desired state, then the active object triggers a set of actions for additional processing within active repository 402. Active repository 402 provides facilities for performing lookup, service/resource brokering, for creating group memberships, setting policies, and so on.

Each of active objects 406 monitors the following entities:
1. state of the service delivered,
2. state of the supporting services, and
3. state of the supported services.

The controls for configuration and deployment are executed at two levels: one is at micro-level and the other is at macro-level. The micro-level controls operate at the level of service templates and service instance objects. Overall controls necessary to orchestrate multiple services in support of one or more higher level services are facilitated by the macro-level controls. The macro-level controls allow management services to orchestrate actions such as federated service configuration and deployment in a consistent manner. The macro-level system controls are built on top of and by leveraging the micro-level system controls.

All planning related logic, such as for dependency resolution and sharing of supporting services, is encapsulated in active objects 406. This logic is dynamically updatable, and plug-ins may be inserted to add functionality that did not exist before.

Each of active objects 406 has four functional components for managing the service the active object represents in the active repository. The four management functions may include: monitor, analyze, configure, and execute (MACE).

In these examples, the monitor function monitors the following entities:
(1) state of the managed service;
(2) state of the services that the managed service component depends upon; i.e., the state of the service components that provide support to the managed service (if any);
(3) state of service components supported by the managed component, i.e., the state of the service components dependent on the managed service component (if any); and
(4) administrative input.

The analyze function provides the decision making capability to an active object. The analyze function is triggered into action by one of the following events:
(1) imbalances in the observed and desired state of the managed object;
(2) imbalances in the functionality and service levels provided by the supporting components; and (3) imbalances in the functionality and the service levels demanded by the components supported by this component.

Any of the above imbalances may occur because of changes either (i) in the current state or (ii) in the desired state. For example, consider a WebSphere® Application Server that is installed on a server, but currently not launched. The current state of this Application Server is "Offline". If the desired state is set to "Online" with certain attributes, such as buffer sizes, number of requests to handle, and connections to a particular database, this results in an imbalance that triggers the analyze component in the corresponding active object. After it is made "Online" with the desired attributes, suppose that the current state changes to "Online" and "Lost connection to database". Again this results in an imbalance that triggers the analyze component into action. Changes in the current state are notified via the monitoring functional component. Changes in the desired state are brought about either by (i) the orchestration and management services or (ii) administrative actions via the administrative interface, or (iii) a request for service from another active object that requires action under the existing policies.

When the analyze component recognizes that there is an imbalance between the current and the desired state of the managed object, the analyze component performs an analysis to establish an optimal configurable state to which the managed service may be transformed. To perform this analysis, the analyze component takes into account the state and the availability of other services and resources in the system, as well as the demands and the priorities of the current and to be supported service components or workload. At the end of the analysis step, the supporting resources and software services are completely determined and the parameters characterizing the support are finalized. For example, parameters characterizing the support may be the number of connections, port number, expected response time, and minimum guaranteed bandwidth. Similarly, the characteristics of the supported services are also finalized.

The complexity and nature of the analysis depends on the decision choices available to the analyze component. The desired state may be specified with a high degree of precision. For example, the desired may detail an "Online" Websphere® instance of specific version, release, and patch level on a specific server with specific network adapters enabled, with specific IP addresses, and specific web services deployed in a specific manner. In such cases, where there are no choices, the analyze component identifies the resources and services to use and configuration parameters to apply to the supporting services so that the managed service may achieve the desired state as prescribed.

On the other hand, the desired state may be specified with a range of possible states or with some degree of freedom. For example, the desired state may detail an "Online" Websphere® instance that is version 6.0 compatible, on any of the servers in a particular network sub-domain, or the desired state of application server may be set to "Online" with no constraints on the server on which it is to be launched. As a result, the first available server may be used. In another example, the constraint may require using a server with the largest amount of memory from a set of servers. When there are choices in selecting and configuring the supporting services and resources, the analyze component makes the decisions by interacting with other active templates and/or active objects.

The interaction may be accomplished by formulating and solving an optimization problem based on the available capacities and performance levels and the corresponding demands by existing and new services being considered for configuration and deployment. The objectives of the optimization problem are governed by the policies associated with the managed object. Some examples of policies associated with a managed service are exclusive use of the service by certain user groups at specified time periods, time set aside for maintenance purposes, preferred resource instances to use as support resources, and so on.

The analyze component takes these policies into account and tries to resolve as many imbalances in the system as possible. If imbalances cannot be completely eliminated, the analyze component tries to satisfy the dependencies such that the achievable new state is closest to the desired state and a transition is possible from the current state to this new state. The outcome of this analysis determines the actual supporting services and resources to be used to correct the imbalances in the system. Since the state of these supporting services and resources determines the ultimate state to which the managed service may be transformed, the managed service may not always realize the actual desired state but may realize a suboptimal state. Depending on how far the realized state is from the desired state, the analysis and the subsequent configuration and deployment steps may be repeated.

The configure function takes the output from the analyze function and performs the following tasks:
(1) create a plan of action to configure or to reconfigure the existing state of the managed service component so the managed service component may transition from its current state to the new state in an optimal manner;
(2) determine the actual commands, scripts, and procedures to run to bring the actual changes in the component; and
(3) send request messages to the supporting service components before self configuration and send confirmation messages to the dependent service after the configuration changes are in place.

The execute function performs the following tasks:
(1) execution of the plan of actions determined by the configure function so that risks of failure are managed according to policies;
(2) execution of verification steps to confirm that the desired changes have taken place;
(3) execution of alternative action plans when initial plans do not succeed; and
(4) verification of interactions with supporting and dependent components after the configuration changes are in place.

The encapsulation of the MACE function within each of active objects 406 enables the managed software service components represented by the active object to evolve independently and to adapt to the changes taking place in the system. Unlike current art in this area, the illustrative embodiments do not require a completely centralized evaluation of the service components to manage those components. The system described here allows for global policies to dictate the overall management of the system without requiring centralized decision making and execution capability. Whenever an active object needs to manipulate the managed object, the active object triggers a system runtime. The system runtime merely examines the state of the active object and performs actions contained in the active object. Some of these actions operate on the managed service and others on other active objects in the repository.

For example, an active object may issue a command asking the managed object to "go offline". In another instance, the active object may send a notification to another active object indicating that the support services are no longer needed from the service managed by the notified active object. The state of the active object may be affected by the external events such as resource monitors, service monitors, and other higher level active objects requesting management actions. When an event changes the state of the active object, the management components described earlier are activated and the active object starts to steer the managed service to a more stable state.

Each of active objects 406 in active repository 402 is associated with management interfaces to control and monitor the behavior of the resources or services that the active objects manage. The management interface is for the actual resource component or service component and includes procedures on how to configure, install, deploy, test, and manage lifecycle events of the component. For each managed service component, the management interface also maintains current status information and dependency information for the possible states to which the managed service may be transitioned. For example, in FIG. 4, active object 410 is associated with application server 412, active object 414 is associated with operating system platform on a server 416, and active object 418 is associated with database server 420.

When a request for service cannot be served using an existing service or service composite, the active template representing the type of service requested is notified. In turn, the active template evaluates the request and either instantiates a new active object to manage a new instance of that service or instructs an existing active object to reconfigure the managed object to accommodate the new request. The instructions for reconfiguration are performed simply by changing the desired state of the managed service. The actions followed in such a case are a subset of the actions followed when a new active object is created. The following describes the set of actions performed by a newly instantiated active object that leads to composing and deploying a composite service from component services by recursively traversing down the dependency tree and then building up the component service tree until the entire composite service is fully configured and deployed.

At creation in active repository 402, the immediate dependencies of an active object are known but are unsatisfied. When an active object is instantiated in active repository 402, the active object is assigned a state called a desired state and another state called the current state. The current state is the state of the service or resource managed by the active object. The desired state is the expected state of the managed service or resource.

The analyze component in the active object continuously monitors the two states. If the two states do not match, the analyze component analyzes possible alternatives for transforming the current state to the desired state and determines if any dependency requirements must be fulfilled to achieve the desired state. Thus, if the current state is "offline" and the desired state is "online" at the time when an active object is instantiated, the analyze component in the active object examines the dependencies that need to be satisfied to make the managed resource/service go online. The dependency information is stored in the dependency requirements interface, which is one of the six management interfaces for the managed object. Each dependency is expressed in terms of the type of service or resource required. The dependency analysis identifies specific types of services or resources needed to transform the current state to the desired sate. In addition, the analyze component also determines the performance and any location constraints on the other services/resources required to satisfy the dependencies. This is a function of the desired state.

For example, if the desired state of a web service requires processing m transactions per minute, where the value of m is known, the analyze component first determines that the web service would depend on a database service and then the analyze component quantifies the characteristics of the database service that can meet the performance requirements. Since the database services are characterized by the speed with which they read and update database records, the analyze component computes the minimum read (r) and update speeds (u) of a database service that would qualify the database service as an eligible supporting service. In other words, the analyze component computes a set of performance constraints on the supporting database service. The relation between m, u, and r may be expressed by a simple algebraic formula or may require evaluation of a polynomial equation representing the approximate behavior of the database system.

The performance specific characteristics for determining the level of performance from supporting services needed to achieve a certain desired state are encoded in the dependency requirements interface. Note that the analyze component does not identify the exact instance of the supporting service/resource to be used to satisfy a particular dependency. The analyze component only quantifies the type of resource/service needed and the performance, location, and security constraints on the supporting components. The information on the desired state, dependencies to be satisfied to arrive at that state, and constraints on the supporting services/resources is then handed over to the configure component.

The configure component determines the actual components and the portions of their capacities to be used to fulfill the dependencies. The configure component makes the determination for each unsatisfied dependency by contacting the active template representing the type of service/resource needed to satisfy that dependency. To each such active template, the configure component sends a request for the type of service it is looking for and associated constraints that must be met. Each such active template tries to fulfill the request in one of three ways: (i) assign an existing service/resource to provide the necessary support, (ii) reconfigure the existing service to accommodate the new demand, or (iii) configure and deploy a new service instance to provide the necessary support. When none of these alternatives are possible, the configure component sends back a negative confirmation. When the support may be provided, the configure component sends back the address of the corresponding active object that manages the supporting service. Note that the performance constraints on the dependencies may be expressed as an acceptable range. For example, the accepted range is expressed by the identified supporting service expected to deliver service in that range. Policies also play a role in determining constraints. A policy may specify conditions when the constraints may be relaxed and may specify the extent to which they may be relaxed. The supporting active templates take these policies into account when making decisions.

The steps followed at each supporting active template are identical to the steps described above in the context of the original request that triggered actions at the indicated active object. These steps are followed recursively until either all the dependencies are resolved or the dependencies cannot be resolved given a set of system resources and with the current set of policies. Thus, the entire dependency tree for providing support to any service component is traversed top-down from active templates to active objects to the supporting active templates and so on. The dependency tree of the actual services is built in a bottom up manner by following a concurrent depth-first traversal of the dependency graph. All paths originating at the supporting nodes are explored simultaneously.

Once the supporting services are configured and deployed in a state ready to provide the necessary support, the requesting active object is notified with a positive confirmation along with the specifics of the active objects managing the supporting services. After confirmation, all the supporting service/resource components and their current configurations, including their available capacities, are known at for each node in the dependency graph. Using this information, the configure component quantifies the actual parameters to use in configuring the service on top of the supporting services. The parameters may include, IP addresses, communication ports to use, user identifications and passwords with access permissions to the supporting services, buffer sizes, and so on. The details of the parameters depend on the type of service. The configuration information is then passed to the execute component.

The execute component executes setup and installation procedures and sends commands so that the managed service is instantiated in its desired state on top of the supporting services. The commands and procedures to be followed are stored in the service deployment management interface of the active object. This completes the deployment of the service as a composition of component services. Following deployment, the user requests are processed or other higher level services are composed on top of such a service composite.

In summary, a composite service is formed by configuring and deploying service components that collectively form the composite. The exact service components are determined dynamically while the dependency tree among components is traversed top down. Starting with the active template for the service type at the highest level of the composite, the dependency tree is traversed top down by visiting the active templates and active objects in the active repository. In the active repository, the active objects are the nodes in the dependency tree. As the tree is traversed top down, the active object at each node is identified. The same dependency tree is also formed among the actual service components managed by the active objects. The actual service components in the dependency graph are configured and deployed in a bottom up manner by following a concurrent depth-first traversal of the dependency graph.

When the composite service is being composed, if any of the component service components are already deployed without the required configuration, the corresponding active object invokes specific actions to bring about the desired configuration changes in the component. Once the service component is reconfigured and deployed and performance is satisfactory, the active object at the higher level in the dependency graph is notified. The next level object configures and deploys the actual service component once all the required supporting components are known to be ready and functional. This continues until all components, including the top-level service component are configured, deployed, and brought to desired service delivery state.

The tear down process occurs when a service is no longer needed or an administrator issues a service tear down command or a policy requiring the service to be turned off goes into effect or the service cannot be sustained under the current set of conditions. The steps involved are the exact reverse of the steps followed while composing a service. In this situation, the active template of the top-level service first sets the desired state in the active object to offline. The analyze component for that active object then notifies the configure component to change the configuration to go offline. Correspondingly, the configuration component first notifies the active templates of the supported service components, if any, of the service termination. The configuration component waits to receive positive acknowledgements from the active templates of the supported components. After receiving the acknowledgments from the active templates that the active templates have terminated their dependencies on the service component, the configuration component notifies the execution component to terminate the service managed by the active object. After the managed service is terminated, the configuration component informs the active templates corresponding to the services providing support to this service, if any, that the support services are no longer needed. After receiving positive acknowledgements from the active templates, the configuration component informs its own active template about the successful termination of the service and then the active object self terminates.

The composite service tear down is also a recursive process with the same steps carried out at each active object that is part of the composite service management tree. The tear-down process may start at any node in the dependency tree and not necessarily at the top level. Once an active object at any node in the dependency graph is notified to go offline, the active object terminates the managed service only after all the services the active object supports have terminated or have found other alternate supporting service components. Similarly, each such supported service does not terminate until all the services dependent on that service have themselves terminated or have found alternate supports. The verification process continues recursively all the way to the top of the dependency graph where the first tear down of the actual target service takes place. Following this, the lower-level service components are terminated in a top down manner. It is important to note, that the recursion unravels concurrently along parallel paths starting at each dependent active object. A software component uninstalls or reconfigures itself as part of the tear down, while a hardware component becomes part of the available resources pool.

FIG. 5 is an example of an object dependency graph for a service in accordance with an illustrative embodiment. Object dependency graph 500 may describe the dependencies of a high-level service such as an enterprise. Object dependency graph 500 captures dependencies among components as a directed graph. Each node of object dependency graph 500 represents a resource or service component. The lines between each node in. object dependency graph 500 represent the dependencies of a high-level component on lower level supporting components. For example, a high-level or composite service may be dependent on multiple individual services and individual resources.

For example, at the root of object dependency graph 500 includes a node indicated by service 502 shown as foobar.redbank.com:80/AccountService. For example, service 502 may be a high-level service for an on-line bank accessible to a user over the Internet. In one example, service 502 may be accessed in the form of a uniform resource identifier (URI), hyperlink, hyper text transfer protocol (HTTP), or other format. Hyper text transfer protocol is the actual communications protocol that enables Web browsing between a client device and a server. A uniform resource identifier is a formatted string that serves as an identifier for a resource, typically on the Internet. Uniform resource identifiers are used in software languages, such as hypertext markup language (HTML) to identify the anchors of hyperlinks.

As shown in this example, service 502 is dependent upon a web service called AccountService 504 and Apache Web Server 508 for additional services including presentation and authentication service functions. The web service, Account- Service 504, has dependencies on IBM WebSphere Application Server 506 and IBM DB2 database server 514. IBM WebSphere Application Server 506 has dependencies on Microsoft Windows® 2003 server 516. IBM DB2 database server 514 is dependent on Windows® 2003 server 518. Further, service 502 is dependent upon externally hosted services 510 and 512 shown as abc.payment.com:9080/Payment and abc.broker.com:9080/Portfolio, respectively. For example, externally hosted service 510 may be used to receive a payment for services offered by service 502. Externally hosted service 512 may be used to save data regarding financial assets in a portfolio. A change management system may be used in conjunction with a user-defined policy to determine how changes and updates may most effectively be implemented to objects within object dependency graph 500.

The composition and tear down of composite services described above illustrate the managing of service components using micro-level controls exercised by the active objects and active templates in the active repository. In doing so, active objects and templates also influence the behavior of the supporting and supported service or resource instances. Moreover, the active objects and templates respond to the changes in the behavior of the supported and the supporting resources. However, the micro-level controls do not bring about simultaneous global changes taking into account the global constraints and policies. Such changes are brought about by the macro-level controls. For example, macro-level controls are needed to enforce global policies such as the manner in which critical resources are to be shared and the manner in which demand is to be prioritized and served. Such policies are necessary when there are scarce resources and demand may exceed supply. The policies are also necessary when complex decisions are to be made and the tradeoffs are not clear-cut.

Figure 6:
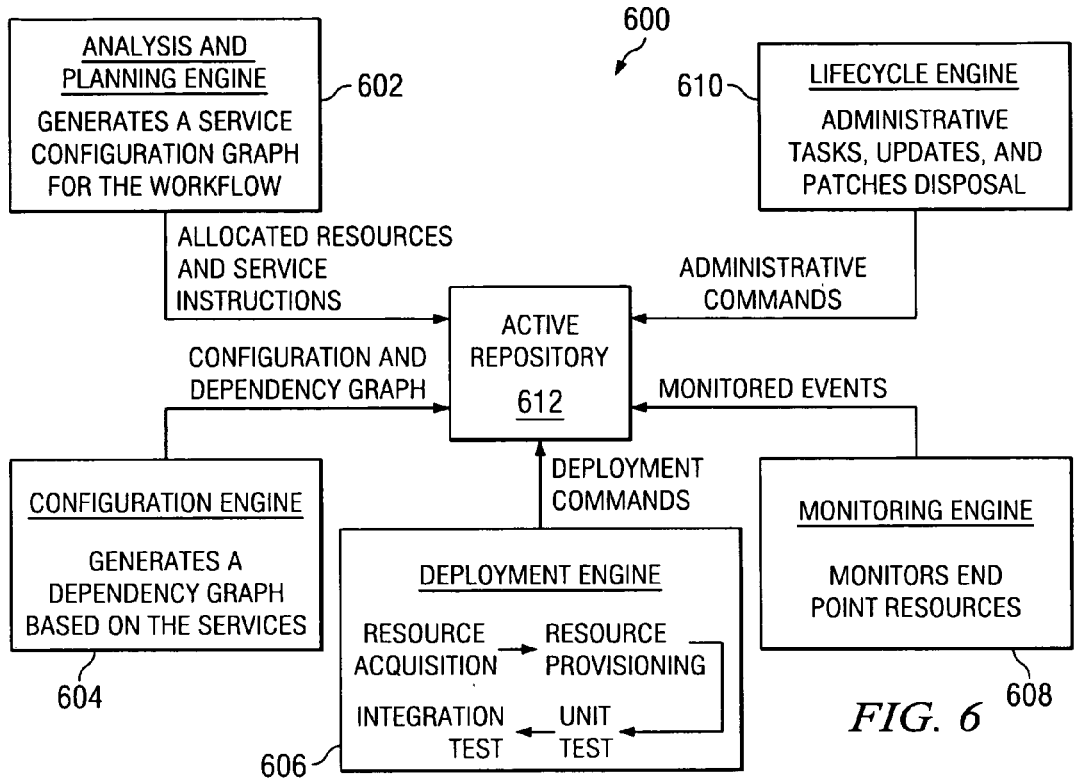
FIG. 6 depicts macro-level controls for managing the composite services in accordance with an illustrative embodiment.

FIG. 6 depicts macro-level controls for managing the composite services in accordance with an illustrative embodiment. Orchestration and management services 600 are orchestration and management services, such as orchestration and management services 310 of FIG. 3. Orchestration and management services 600 consist of management services that provide macro-level controls for managing the composite services.

Orchestration and management services 600 are provided by analysis and planning engine 602, configuration engine 604, deployment engine 606, monitoring engine 608, and lifecycle engine 610. Each of these engines interacts with active repository 612 and the management objects represented in active repository 612. The macro-level controls provided by the five engines shown are translated into micro-controls. Active objects, such as active objects 406 of FIG. 4 in active repository 612, control the corresponding resource and component services so that the desired effects of the macro controls are realized at the micro-level.

As stated earlier, active repository 612 manages all life-cycle aspects of software service components so as to deliver solutions in response to service requests. Active repository 612 performs this function taking into account related system management policies as well as constraints placed by the availability of physical resources. As further explained, one aspect of this life-cycle management is the composition of a complex service whenever there is a demand for such a service. Another aspect is the tearing down or decomposition of a complex service when there is no demand, or policies require such an action, or one or more supporting services are unavailable.

As previously explained, an active object in active repository 612 is also capable of configuring the managed service to support a set of dependent components or to process a class of requests. When supporting services and resource components are to be shared among multiple entities or when these components are heterogeneous or when they are scarce, these services and resources need to be brokered and allocated to one or more higher level dependent services. A service and resource component is one that differs from other components in one or more attribute capacities. A scarce component is a component with multiple dependent components competing for the same supporting resource. A supporting resource is one used by a high-level service to provide the functionality of the high-level service. For example, if the high-level service is a bank, the supporting resources may include an Internet portal for users, a credit checking service, and a database with customer information. Orchestration and management services 600 provide the necessary brokering, allocation, matching, configuration, and deployment services.

Analysis and planning engine 602 provides the service and resource brokering, matching, and allocation functionality. When service and resource capacities are scarce or when active templates cannot resolve sharing issues as a result of existing policies, higher level active objects requiring supporting components construct dependency graphs and pass their requirements along with the dependency graph to analysis and planning engine 602. Analysis and planning engine 602 collects all such requirements and dependencies outstanding in active repository 612. Analysis and planning engine 602 gathers the current available resource and service component capacities, resource and service specific policies, priorities, preferences, and overall business goals. Analysis and planning engine 602 finds this information in the service specification, service configuration, and service state sections of the active objects being analyzed.

Analysis and planning engine 602 formulates an optimization problem by modeling the dependencies in the dependency graphs and the available capacities as constraints and the business goals as the objective function. The solution to this optimization problem determines exactly which supporting components are to be used at each node in the dependency graphs analyzed.

Analysis and planning engine 602 also determines if a supporting component is to be shared by multiple dependent services or if the supporting component is to be used in a dedicated mode, any priority scheme to be used for sharing, and when exactly a supporting component is to be used by a dependent component. If a supporting component does not exist in active repository 612 or existing policies do not allow sharing, new instance of that object is created using the corresponding active template in active repository 612. The desired state of the existing and newly created instance objects is set to reflect the new demands placed in the dependency graph.

Analysis and planning engine 602 prepares a solution dependency graph for each active object with unfulfilled dependencies. The solution dependency graph is written into the service configuration section of the corresponding active object. Analysis and planning engine 602 also updates the desired states of the active objects that provide the supporting services in the dependency tree.

If analysis and planning engine 602 is unable to satisfy the dependencies of the active object, the current state does not match the desired state. In such case, requirements of the active object are reconsidered by analysis and planning engine 602 during the next evaluation phase. Reconsideration continues until necessary resources and services become available or until the service corresponding to the active object is no longer needed.

The service dependency graph is used by configuration engine 604 to generate the configuration description of the services needed to fulfill the requirements of the higher level services. Configuration engine 604 generates a configuration dependency graph that describes the configuration settings for each component in the dependency tree and the order in which the component services and resources are to be deployed and configured. Configuration dependency graph is also stored in the deployment section of the object in question and used by deployment engine 606. Configuration engine 604 also updates the configuration settings for each active object in the configuration dependency graph. The updates prompt the corresponding active objects to bring about the desired changes in the objects they manage so the components may provide the necessary support.

Next, deployment engine 606 uses the configuration dependency graph to request resources needed to fulfill the request. Deployment engine 606 follows an internal workflow to allocate and provision resources and perform unit and integrity tests on the provisioned and configured services. For each resource, deployment engine 606 uses the configuration dependency graph to initiate the installation and configuration of the resource. The progress of the installation and configuration is continuously monitored by monitoring engine 608. Monitoring engine 608 is responsible for updating the status of each representative object in the repository. If a failure is encountered during unit or integrity testing, then the workflow restarts by performing recovery actions which may include acquiring a new set of resources.

Figure 7:
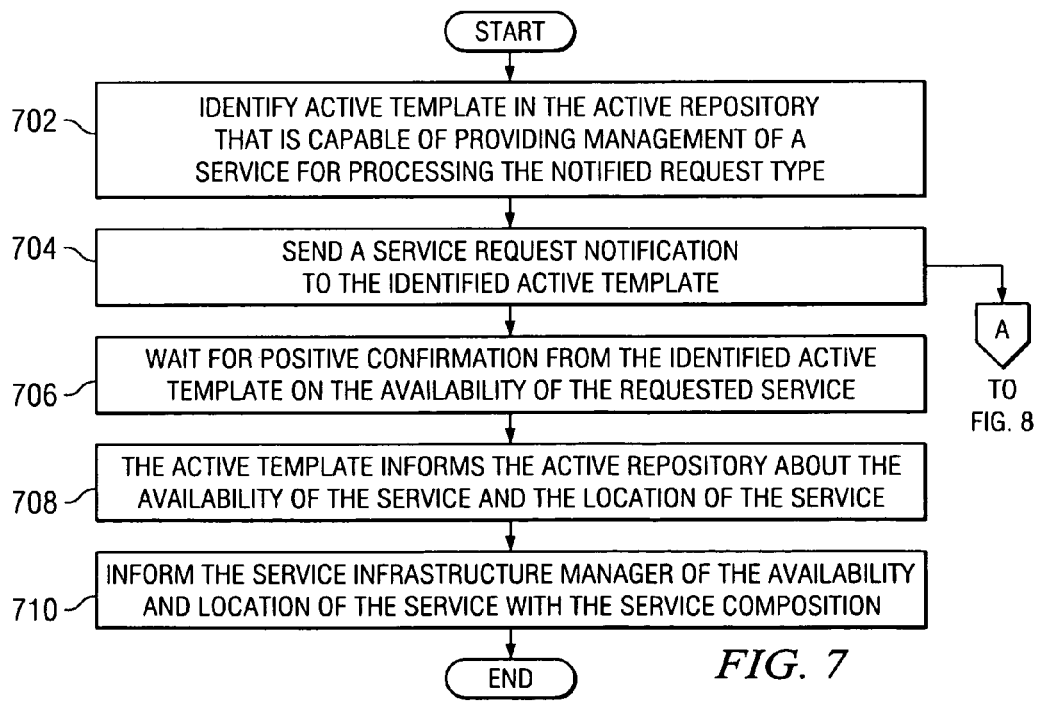
FIG. 7 is a flowchart for an operation used to compose and manage a composite software service in accordance with an illustrative embodiment.

FIG. 7 is a flowchart for an operation used to compose and manage a composite software service in accordance with an illustrative embodiment. Prior to the initiation of the process of FIG. 7, a request is received to deploy a software service in a computer network. If the requested software service is a new software service, a service infrastructure manager interface, such as service infrastructure manager interface 306 of FIG. 3 notifies the active repository such as the active repository 312 of FIG. 3 about the request. The service infrastructure manager waits for a response from the active repository.

In response to this notification, the active repository identifies an active template in the active repository that is capable of providing management of a service for processing the notified request type (step 702). Next, the active repository sends a service request notification to the identified active template (step 704). Next, the active repository waits for positive confirmation from the identified active template on the availability of the requested service (step 706). After the requested service is made available, the active template informs the active repository about the availability of the service and the location of the service (step 708). The active repository in turn informs the service infrastructure manager of the availability and location of the service with the service composition (step 710) with the process terminating thereafter.

FIG. 8 is a service composition flowchart for an active template in accordance with an illustrative embodiment. The process of FIG. 8 may be implemented by an active template such as active templates 404 of FIG. 4 that reside in an active repository, such as active repository 312 of FIG. 3. After being notified in step 704 of FIG. 7, the active template determines if any of the existing active objects that it has spawned may be able to handle the outstanding notification event(s) or if a new active object needs to be instantiated (step 802). The decision is made in step 802 taking into account the requirements of the new request and the ability to handle those requirements by the existing services managed by the existing active objects. An existing service is used to process the request as long as that does not impact current commitments and does not violate any existing policies. Otherwise, a new service instance is to be created and managed.

If the active template decides to instantiate the new active object, the active template spawns a new active object in the active repository and sets the desired state to the state that would result in the successful instantiation of the required service instance (step 806). For example, in response to a request for account update, the active template may spawn an active object for managing AccoutService web service such as service 502 of FIG. 5 and set the desired state to "go online" with the AccountService. Next, the active template waits for positive confirmation from the active object achieving the desired state in the managed service (step 808). The active template then sends positive confirmation on requested service availability to the active repository (step 810) with the process terminating thereafter. The active repository is the service requester in the process of FIG. 8.

If in the determination of step 802, the active template decides not to instantiate a new active object, the process identifies an existing active object to reconfigure and changes its desired state (step 812). Next, the active template waits for positive confirmation from the active object achieving the desired state in the managed service (step 808).

FIG. 9 is a flowchart for a service composition for an active object in accordance with an illustrative embodiment. The process of FIG. 9 may be implemented by an active object such as active object 410 of FIG. 4. Concurrently, after step 806 and step 812 of FIG. 8, the instantiated active object determines whether the current state is the same as the desired state (step 902). If the current state is the same as the desired state, the instantiated active object continues to monitor the desired and current states and step 902 is repeated. If the current state is not the same as the desired state in step 902, the instantiated active object determines if the configuration of the service component managed by the active object is in the desired state (step 904). Next, the process determines the dependencies on other service components when the managed service component is in the desired state (step 906). Next, the process determines the bounds on configuration parameters for the supporting service components (step 908). Next, the process sends the service request notifications to the active templates associated with the required supporting services (step 910).

Next, the process waits for positive confirmation from the active templates of supporting services (step 912). Next, when all supporting service components are ready to serve, the process sends configuration commands to the service component managed by the active object so the service component may transition to the desired state from the current state (step 914). Next, when the service component managed by the active object is running in the desired configuration, the process sends positive confirmation to the service component's active template (step 916) with the process terminating thereafter. Concurrently, after step 910 of FIG. 9, the process proceeds to step 802 of FIG. 8 where the active templates for the supporting services identified in step 906 of FIG. 9 execute the process steps to enable the necessary support.

FIG. 10 is a flowchart for service decomposition process for an active template in accordance with an illustrative embodiment. The process is initiated when an active template receives a notification that a service provided by one or more of the managed service instances that the active template manages via active objects is no longer needed. The notification may be triggered by a policy or administrative command or expected workload reduction or off lining of a dependent service component. Regardless of the cause of the notification, from the active template's point of view, the notification means reduction in the workload supported by the service components. The process of FIG. 10 may be implemented by active templates, such as active templates 404 of FIG. 4.

The process of FIG. 10 begins by analyzing the notification, the active template determines one or more service instances that will be affected by the termination of the dependency and from that the active template identifies the active objects corresponding to those service instances (step 1002). Next, the active template determines the effect of dependency termination on the mapping of the current workload to service components managed by the set of active objects (step 1004). Even if the terminated service dependency is handled by one of the service instances to maintain load balance and policy-based matching of service instances, the active template analyzes the configurations of the service instances collectively, with and without the to-be terminated dependency. Because of the change in the total workload, the new configuration, such as mapping of remaining service dependencies onto the service instances, may result in termination and/or reconfiguration of one or more service instances. Using the new configuration, the active template then loops over the identified list of affected service instances until each affected active object has been processed (step 1006). For each such active object the process determines the configuration of the active template determines, by comparing the old and new configurations, if the service component managed by the active object is to be terminated or to be reconfigured. A determination is then made as to whether the service component managed by the active object is to be terminated or reconfigured? (step 1008).

If the service instance is to be terminated in step 1008, the active template sets the desired state of the affected active object to terminate (step 1010). This step and all the steps leading to this step are part of the service tear down or decomposition process.

If the service instance is to be reconfigured in step 1008, the active template sets the desired state of the affected active object to reconfigure with the new workload and new dependent service components (step 1012). After step 1012, the process proceeds to the service instance reconfiguration as described in step 902 of FIG. 9.

Figure 11A:
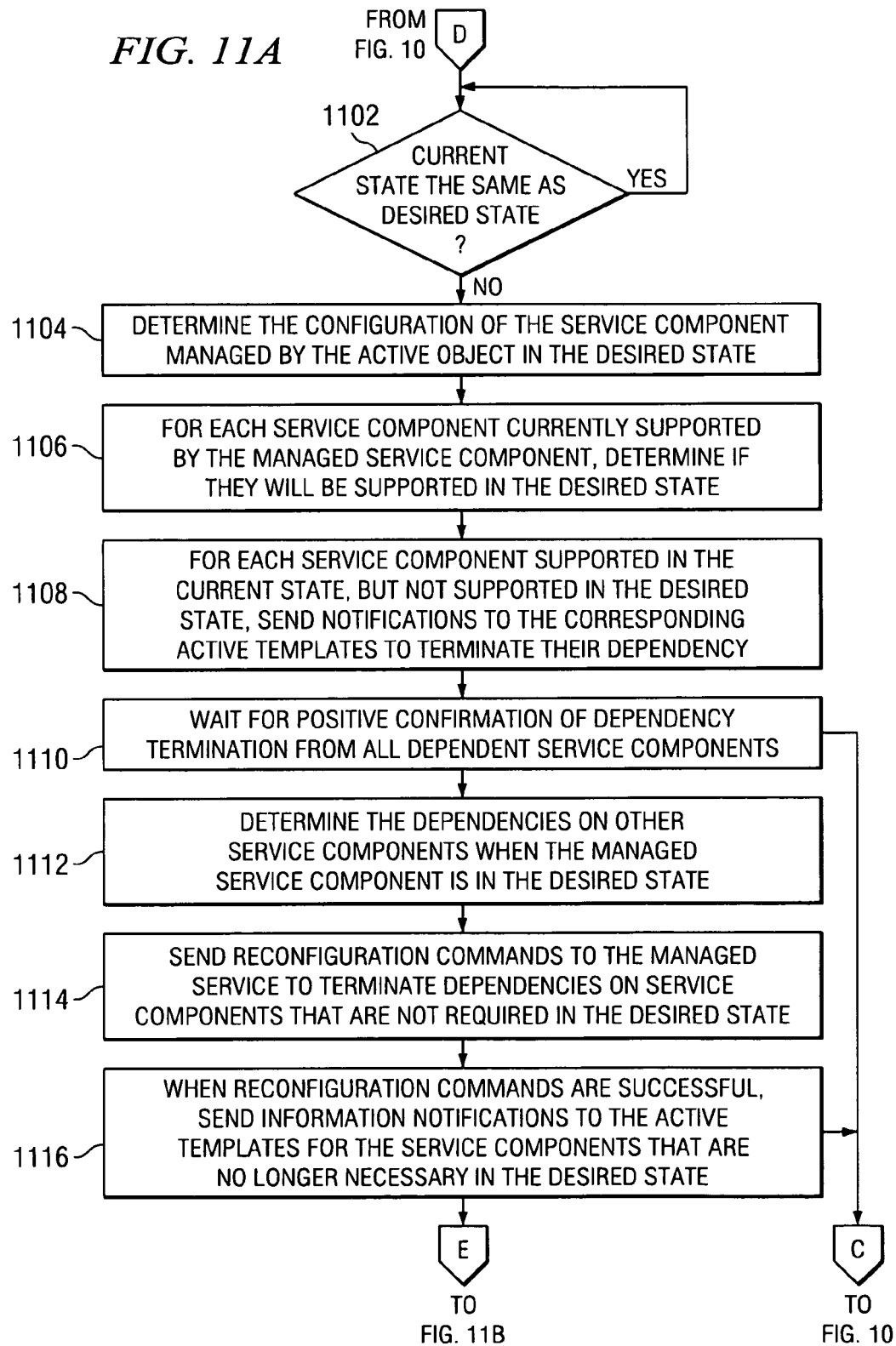

FIGS. 11A-11C are flowcharts for service decomposition in an active object in accordance with an illustrative embodiment. The processes of FIGS. 11A-11C are implemented by an active object, such as active object 410 of FIG. 4. After step 1010 of FIG. 10, the process is carried out concurrently for each similarly affected active object. The process steps are triggered at the affected active object when the active object determines that the current state and the desired states for the managed service instance do not match (step 1102). As long as the two states match, step 1102 is repeated. If the current state is not the same as the desired state in step 1102, the process determines the configuration of the service component managed by the active object in the desired state (step 1104).

Next, for each service component currently supported by the managed service component, the process determines if each service component will be supported in the desired state (step 1106). Next, for each service component supported in the current state but not supported in the desired state, the process sends notifications to the corresponding active templates to terminate their dependency (step 1108).

Next, the process waits for positive confirmation of dependency termination from all dependent service components (step 1110). Next, the process determines the dependencies on other service components when the managed service component is in the desired state (step 1112). Next, the process sends reconfiguration commands to the managed service to terminate dependencies on service components that are not required in the desired state (step 1114). Next, when reconfiguration commands are successful, the process sends information notifications to the active templates for the service components that are no longer necessary in the desired state (step 1116).

Next, the process determines whether the managed service is to be terminated (step 1118). If the managed service is to be terminated, the process sends reconfiguration commands to the managed service to prepare for termination (step 1120). Next, the process sends notifications to the managed service's active template informing of service component termination (step 1122). Next, when the managed service component is ready to terminate, the process sends the command to terminate the managed service component (step 1124). Next, the managed service component self terminates (step 1126) with the process terminating thereafter.

If the managed service is not to be terminated in step 1118, for service components that the managed service will continue to depend upon in the desired state, the process determines if the dependencies need to be reconfigured (step 1128). Next, for each supporting service that needs to be supported, the process suspends the dependency and sends the service reconfiguration notification requests to the corresponding active templates (step 1130). Next, for any new service components that the managed service will depend upon in the desired state, the process sends the service request notifications to the active templates associated with the required services (step 1132).

Next, the process waits for positive confirmation from the active templates of supporting services required in the desired state (step 1134). Next, when all supporting service components are ready to provide the necessary support, the process sends reconfiguration commands so that it may transition from the current state to the desired state (step 1136). Next, when the service component managed by the active objects is running in the desired state, the process changes the current state to the desired state and informs the service component's active template of the state change (step 1138) with the process terminating thereafter Concurrently, after step 1110, and step 1122, the process returns to step 1002 of FIG. 10. Concurrently, after step 1130 and step 1132, the process returns to step 802 of FIG. 8.

Resummarizing, the illustrative embodiments provide a repository of templates and objects for representing dependency relations among managed entities in a dynamic and autonomous manner. Service components are self-organized to form the complete support mechanism needed to configure and deploy high-level services. High-level services with unfulfilled or unsatisfied dependencies are automatically detected. Qualifying services and resource components are identified and matched partially or complete to satisfy dependency requirements of one or more high-level services either partially or completely.

The planning use allows supporting services to effectively meet business goals. Global optimization for system constrains is performed by taking into account high-level service dependencies and requirements, available capacities of supporting service and resource components, component specific policies and preferences, and an objective function based on the specified business goals.

Deployment-ready dependency relations among active objects in the active repository are dynamically composed for composite service deployment using available resources in a distributed environment. Changes in the resource pool are automatically responded to. For example, if a machine is removed for service, then one does not have to reconfigure all the workflows that rely on that machine to be available. The use of objects and templates in an active repository that uses a level of indirection enables easy management of the underlying physical resources without requiring system administrators to track, configure, and deploy each component in a composition. Complex services are composed and decomposed by identifying and configuring supporting services by introducing a single change in the state of the high-level service.

Thus, illustrative embodiments provide computer implemented method, apparatus, and computer usable program code for on-demand composition and teardown of service infrastructure. The method configures and deploys software service and resource components so that components work together to provision a high-level service that behaves in an expected manner. Automatic management and control occurs at the component level as well as at the composite federated level. As a result, high-level services are deployed, configured, reconfigured, and tore down automatically on demand reducing the amount of time required by administrators and other IT personnel to maintain high-level services.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating a composite service, the computer implemented method comprising:
   responsive to receiving a service request notification instantiating a service component to process the service request notification;
   identifying an active template to manage the instantiated service component, the active template comprising a plurality of active objects;
   determining whether to instantiate a new active object in the identified active template to manage the instantiated service component; and
   responsive to a positive determination to instantiate a new active object, generating the new active object, the new active object having a service state;
   configuring the service state of the new active object to manage the instantiated service component in a desired state, the desired state being the service state required to achieve a desired behavior of the instantiated service component; and
   sending a positive confirmation from the new active object, the positive confirmation being based on an availability of a requested service from the instantiated service component;
   responsive to a negative determination to instantiate a new active object, reconfiguring a service state of an existing active object from a current state to a different desired state, the different desired state being the service state required to achieve a desired behavior of the instantiated service component.

* * * * *